May 31, 1955 W. E. HORROCKS Re. 24,012
CONTAINER HAVING SPOON CONTENTS MEASURING MEANS
Original Filed March 10, 1951
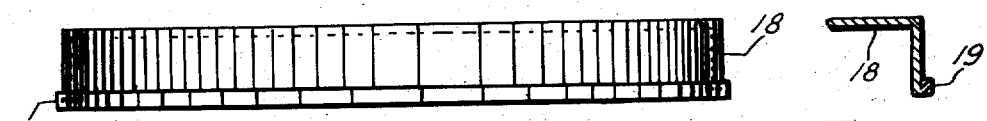
FIG. 3
FIG. 5
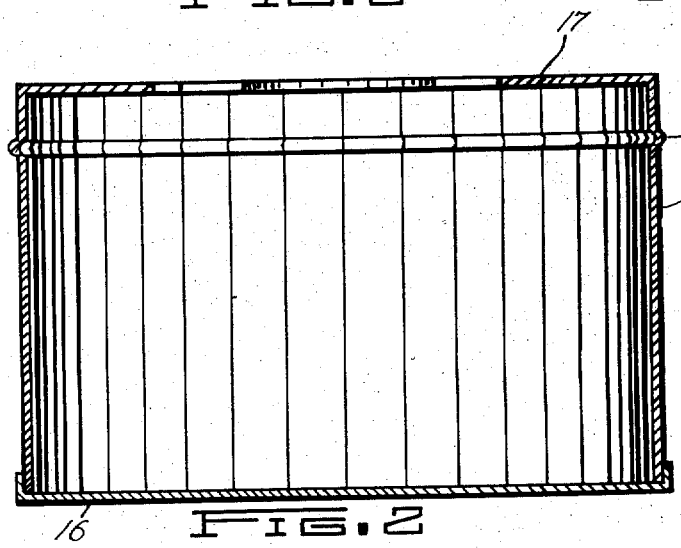
FIG. 2
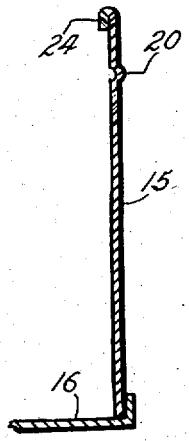
FIG. 4
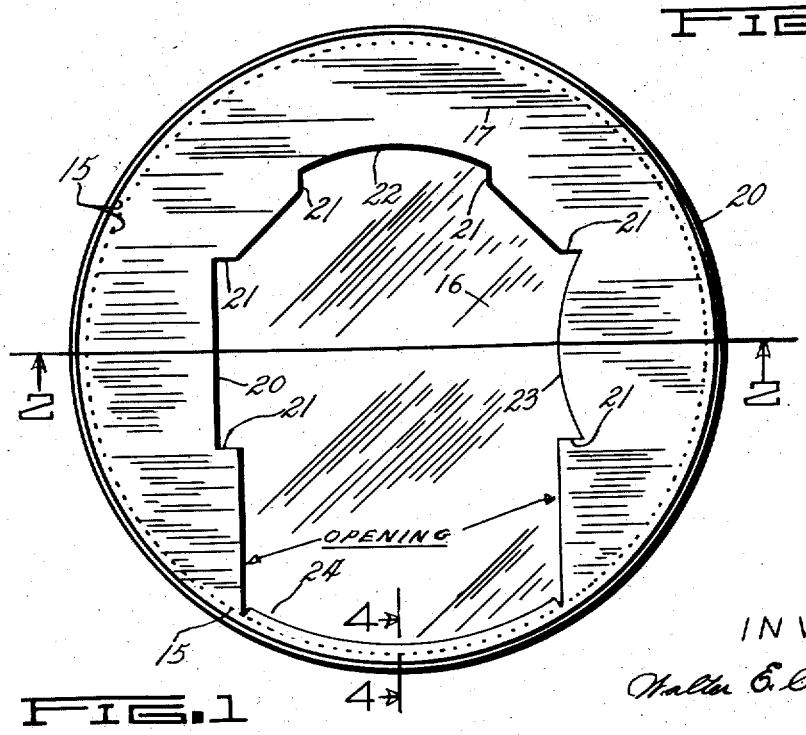
FIG. 1
INVENTOR
Walter E. Horrocks United States Patent Office Re. 24,012
Reissued May 31, 1955

24,012

CONTAINER HAVING SPOON CONTENTS MEASURING MEANS

Walter E. Horrocks, Lakewood, Ohio

Original No. 2,665,029, dated January 5, 1954, Serial No. 214,896, March 10, 1951. Application for reissue August 9, 1954, Serial No. 448,790

5 Claims. (Cl. 220—90)

Matter enclosed in heavy brackets [ ] appears in the original patent but forms no part of this reissue specification; matter printed in italics indicates the additions made by reissue.

The invention relates to improvements in containers provided with means to measure the contents of a spoon or the like when withdrawing the spoon from the container.

An important object is to provide a container provided with scraping means to measure various quantities of a spoon or the like as the spoon is withdrawn from the container.

Another object is to provide a container provided with means for measuring the level quantities of a spoon.

Another object is to provide a container provided with means for measuring the rounded contents of a spoon.

A still ufrther object is to provide a container provided with means for *initially* measuring the scant contents of a spoon.

*The most important object of the invention is to provide a structure having spoon leveling means for initially scrape leveling any one of three different quantities of a spoon as the spoon is drawn over the scraping means or as the scraping means is drawn over the spoon.*

Other objects and advantages of the invention will be apparent during the course of the following description, in the accompanying drawings, forming a part of this specification, and in which like numerals are employed to designate like parts throughout the same.

Fig. 1 shows a top view of a container *employing the invention* with the cover removed, Fig. 2 shows a section view on line 2—2 of Fig. 1, Fig. 3 shows a side view of the container cover, Fig. 4 shows a sectional view on line 4—4 of Fig. 1, and Fig. 5 shows a sectional view through the side rim of the cover shown in Fig. 3.

Referring to the drawings more in detail at Fig. 1, Fig. 2, and Fig. 3 shows a type of container structure such as is extensively used for containing such substances as lard, and coffee, which comprises a cylindrical body portion 15, a bottom portion 16, a top portion 17, and a cover 18, which preferably has a hem 19 formed on the rim which abuts the bead 20 which is rolled in the body portion 15. The top portion 17 *consists of a flat plate structure which* has an inwardly disposed opening therethrough provided with a border having a straight portion 20 terminating into two parallel side portions 21 forming a notched recess. At right angles to the above described straight portion 20, the border has a convex portion 22 terminating into two parallel side portions 21 forming a notched recess. At right angles to the above described convex portion the border has a concave portion 23 terminating into two parallel side portions 21 forming a notched recess. The border of the opening in the top portion 17 terminates at the intersection of the body portion 15, and the top section of the body between the parallel sides of the opening is bent inward substantially as shown at 24 in Fig. 4. The straight recessed portion 20 provides means to initially measure the level contents of a spoon when withdrawing the spoon from the container transversely across the edge of the level scraping means. The convex recessed portion 22 provides means to initially measure the rounded contents of a spoon when withdrawing the spoon from the container transversely across the edge of the rounded scraping means in the same manner as described above pertaining to the straight recessed portion. The concave recessed portion 23 provides means to initially measure the scant contents of a spoon when withdrawing the spoon from the container transversely across the edge of the scant scraping means in the same manner as described above pertaining to the straight recessed portion. The parallel sides of the opening terminating against the body portion 15 as shown in Fig. 1 allows of the contents to be easily poured or scraped out of the container if so desired. It is to be noted that if the container is made of metal that the cover portion of the container may be hermetically sealed to the body section by a removable metal band such as is extensively used for this purpose.

The recessed notches 20, 22, and 23 herebefore described terminate against the parallel sides 21 in such a manner as to additionally provide means for guiding the spoon across the described scraping means 20, 22, and 23 respectively.

From the above description it will be apparent that the device shown and described provides a structure provided with scraping means for initially measuring the three different contents of a spoon or the like *such* as when the spoon is inserted into the contents of a container and then withdrawn from the container by initially scraping the spoon transversely across the selected scraping means. It is also obvious that the width of the convex recess described, can be designed to primarily accommodate a tablespoon, and the depth can be designed to scrape a scant tablespoon that will be equal to a full teaspoonful, in which the scraping means as shown provides a means of measuring the contents of a scant tablespoon, or the cubical contents of a level teaspoon by using the same scraping means.

It is to be undestood that the form of my invention, herewith shown and described, is to be taken as a preferred example *of an application* of the same, and that various changes in the shape, size and arrangement *or uses* of parts may be resorted to, *for initially scrape measuring the contents of a spoon,* without departing from the spirit *or the concept* of my invention, or the scope of the subjoined claims.

Having described my invention, I claim as follows:

1. A measuring device of the character described, comprising a cylindrical container having a top provided with a singular opening defined by a border disposed inwardly of the perimeter of the said container, said top providing scraping means comprising a series of three different shaped recesses having straight, inwardly curved and outwardly curved bottom margins, arranged around the border of the said opening in the top in such a manner that the surplus contents of a spoon can be initially scraped off the spoon when withdrawing the spoon transversely across one of the said margins; to scrape measure either one of three different contents of a spoon of the like.

2. A measuring device as described in claim 1, having its top opening terminating at the perimeter of the device in such a manner that its contents may be easily poured therefrom.

3. A measuring device as described in claim 1, including a cover over the said opening substantially as described.

*4. A container structure providing a spoon leveling device comprising in combination, a body portion, a bottom portion supporting the body portion, and a flat surfaced top portion having an opening providing a border comprising a series of three different shaped recesses having straight, inwardly curved and outwardly curved*

*bottom margins arranged about the border in such a manner that any surplus contents on a spoon can be initially scraped off the spoon by drawing the spoon transversely across one of the said margins; to scrape level either one of three different contents of a spoon.*

*5. A spoon leveling device having a flat surfaced portion providing a border having a continuous series of three different shaped recesses having straight, inwardly curved and outwardly curved bottom margins, arranged about the border in such a manner that any surplus contents on a spoon can be initially scraped off the spoon by initially drawing the edge of the spoon transversely across one of the said margins; to selectively scrape level either one of three different contents of a spoon or the like.*

References Cited in the file of this patent or the original patent

UNITED STATES PATENTS

| | | |
|---|---|---|
| 1,798,073 | Doyen | Mar. 24, 1931 |
| 1,833,212 | Gilmartin | Nov. 24, 1931 |
| 1,875,379 | Holmes | Sept. 6, 1932 |